(12) United States Patent
Deal et al.

(10) Patent No.: US 6,360,878 B1
(45) Date of Patent: Mar. 26, 2002

(54) CONVEYOR SYSTEM

(76) Inventors: Gregory L. Deal, 920 - 42nd Ave. North, Fargo, ND (US) 58102; Jeff Peltier, 3814 - 3rd Ave. NW., Fargo, ND (US) 58102

( * ) Notice: Subject to any disclaimer, the term of this patent is extended or adjusted under 35 U.S.C. 154(b) by 0 days.

(21) Appl. No.: 09/499,164

(22) Filed: Feb. 7, 2000

(51) Int. Cl.[7] .................. B65G 15/40; B65G 15/42
(52) U.S. Cl. .................. 198/819; 198/823; 198/311
(58) Field of Search ........................ 198/819, 823, 198/690.2, 311

(56) References Cited

U.S. PATENT DOCUMENTS

| | | | | |
|---|---|---|---|---|
| 3,311,221 A | * | 3/1967 | Burkitt et al. | 198/819 X |
| 3,326,354 A | * | 6/1967 | Adelott | 198/819 |
| 3,338,383 A | * | 8/1967 | Hashimoto | 198/819 |
| 3,593,378 A | * | 7/1971 | Kamisaka | 425/78 |
| 3,724,646 A | * | 4/1973 | Kornylak | 198/823 |
| 4,878,576 A | * | 11/1989 | Dietzen | 198/823 X |
| 5,052,545 A | * | 10/1991 | Gongen | 198/823 X |
| 5,152,652 A | * | 10/1992 | Campbell | 198/550.01 |
| 5,511,652 A | * | 4/1996 | McGinnis | 198/819 |
| 5,941,368 A | * | 8/1999 | Horak | 198/819 |
| 6,029,801 A | * | 2/2000 | Odin et al. | 198/819 X |
| 6,068,103 A | * | 5/2000 | Werner | 198/311 |
| 6,079,551 A | * | 6/2000 | Horak | 198/819 |
| 6,170,646 B1 | * | 1/2001 | Kaeb et al. | 198/819 X |

FOREIGN PATENT DOCUMENTS

| | | | | |
|---|---|---|---|---|
| JP | | 06092425 | * 4/1994 | 198/819 |

* cited by examiner

*Primary Examiner*—Stephen T. Gordon
*Assistant Examiner*—Patricia Engle
(74) *Attorney, Agent, or Firm*—Michael S. Neustel

(57) ABSTRACT

A conveyor system for increasing the angle capabilities and allowing shorter lengths of a belt conveyor. The inventive device includes a support frame, a tube attached to the support frame, an endless belt within the tube, a plurality of paddle members attached to the outer surface of the endless belt, and a wind skirt attached to the lower portion of the tube. The plurality of paddle members include a plurality of V-shaped cutouts for allowing the endless belt to become curved or flattened. The wind skirt includes a pair of side slots that receive the outer portions of the endless belt. At least one support plate is attached to the wind skirt for maintaining the endless belt within the wind skirt during and after operations.

9 Claims, 7 Drawing Sheets

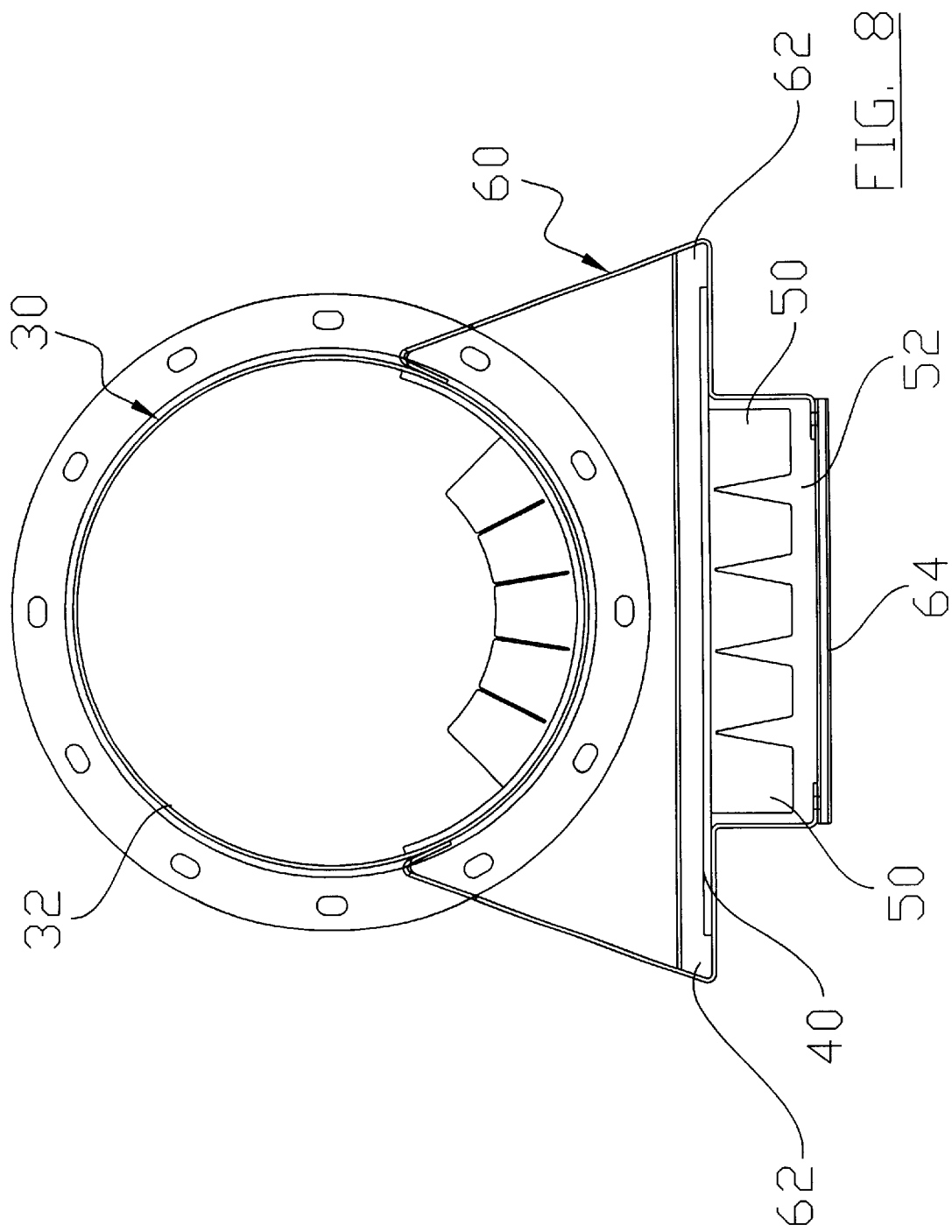

CONVEYOR SYSTEM

BACKGROUND OF THE INVENTION

1. Field of the Invention The present invention relates generally to belt conveyors and more specifically it relates to a conveyor system for increasing the angle capabilities and allowing shorter lengths of a belt conveyor.

2. Description of the Prior Art

Belt conveyors have been in use for years. Typically, a belt conveyor includes a tubular structure, a support structure for elevating the tubular structure at an angle, an endless belt positioned about the tubular structure, and a motor means for rotating the tubular structure. A conventional belt conveyor has an inlet for receiving the particulate material such as grain, fertilizer, sand, or gravel and an outlet for dispensing the particulate material. The endless track typically includes a plurality of ridges for engaging the particulate material. The tubular structure typically has a plurality of rollers that support the return portion of the endless belt. Conventional belt conveyors are generally utilized to elevate and transport particulate material from one location to another.

Conventional belt conveyors typically require a relatively flat angle to transport particulate material. If the angle of the conventional belt conveyor is too steep, then the particulate material falls slides downwardly and rearwardly toward the inlet of the conventional belt conveyor. Since the angle of a conventional belt conveyor is relatively small, the overall length of the conventional belt conveyor must be longer to elevate the particulate material to desired heights. In addition, because conventional belt conveyors are longer they require more room about a storage structure to load and unload particulate material.

Examples of patented conveyor devices include U.S. Pat. No. 3,326,354 to Aydelott; U.S. Pat. No. 5,511,652 to McGinnis; U.S. Pat. No. 5,152,391 to Campbell; U.S. Pat. No. 3,593,378 to Kamisaka which are all illustrative of such prior art.

Aydelott (U.S. Pat. No. 3,326,354) discloses a belt conveyor for conveying semi-fluid materials on a flexible belt. Aydelott teaches an apparatus for continuously shaping a belt into a tube, opening the tube-shaped belt, depositing semi-fluid materials within the belt, enclosing and lifting the materials, and opening the belt to release the materials.

McGinnis (U.S. Pat. No. 5,511,652) discloses a construction conveyor belt for moving powdery ash-like materials. McGinnis specifically teaches a conveyor belt construction including lateral edges which fold upwardly and inwardly upon the application of longitudinal directed tension.

While these devices may be suitable for the particular purpose to which they address, they are not as suitable for increasing the angle capabilities and allowing shorter lengths of a belt conveyor. Conventional belt conveyors require longer lengths and decreased angles to efficiently transport particulate material.

In these respects, the conveyor system according to the present invention substantially departs from the conventional concepts and designs of the prior art, and in so doing provides an apparatus primarily developed for the purpose of increasing the angle capabilities and allowing shorter lengths of a belt conveyor.

SUMMARY OF THE INVENTION

In view of the foregoing disadvantages inherent in the known types of belt conveyors now present in the prior art, the present invention provides a new conveyor system construction wherein the same can be utilized for increasing the angle capabilities and allowing shorter lengths of a belt conveyor.

The general purpose of the present invention, which will be described subsequently in greater detail, is to provide a new conveyor system that has many of the advantages of the belt conveyors mentioned heretofore and many novel features that result in a new conveyor system which is not anticipated, rendered obvious, suggested, or even implied by any of the prior art belt conveyors, either alone or in any combination thereof.

To attain this, the present invention generally comprises a support frame, a tube attached to the support frame, an endless belt within the tube, a plurality of paddle members attached to the outer surface of the endless belt, and a wind skirt attached to the lower portion of the tube. The plurality of paddle members include a plurality of V-shaped cutouts for allowing the endless belt to become curved or flattened. The wind skirt includes a pair of side slots that receive the outer portions of the endless belt. At least one support plate is attached to the wind skirt for maintaining the endless belt within the wind skirt during and after operation.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a conveyor system that will overcome the shortcomings of the prior art devices.

A second object is to provide a conveyor system for increasing the angle capabilities and allowing shorter lengths of a belt conveyor.

Another object is to provide a conveyor system that transports various types of particulate material.

An additional object is to provide a conveyor system that has a reduced overall length compared to a conventional belt conveyor.

A further object is to provide a conveyor system that can operate at a steeper angle than a conventional belt conveyor.

Another object is to provide a conveyor system that does not require idler rollers to support the return portion of the endless belt.

An additional object is to provide a conveyor system that is capable of utilizing tubular structures having various cross sectional areas such as circular or oval.

A further object is to provide a conveyor system that increases the conveying capacity of a belt conveyor.

Another object is to provide a conveyor system that requires less working room when in operation because of the reduced length.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 8 is an end view of the present invention.

DESCRIPTION OF THE PREFERRED EMBODIMENT

Figure 1:
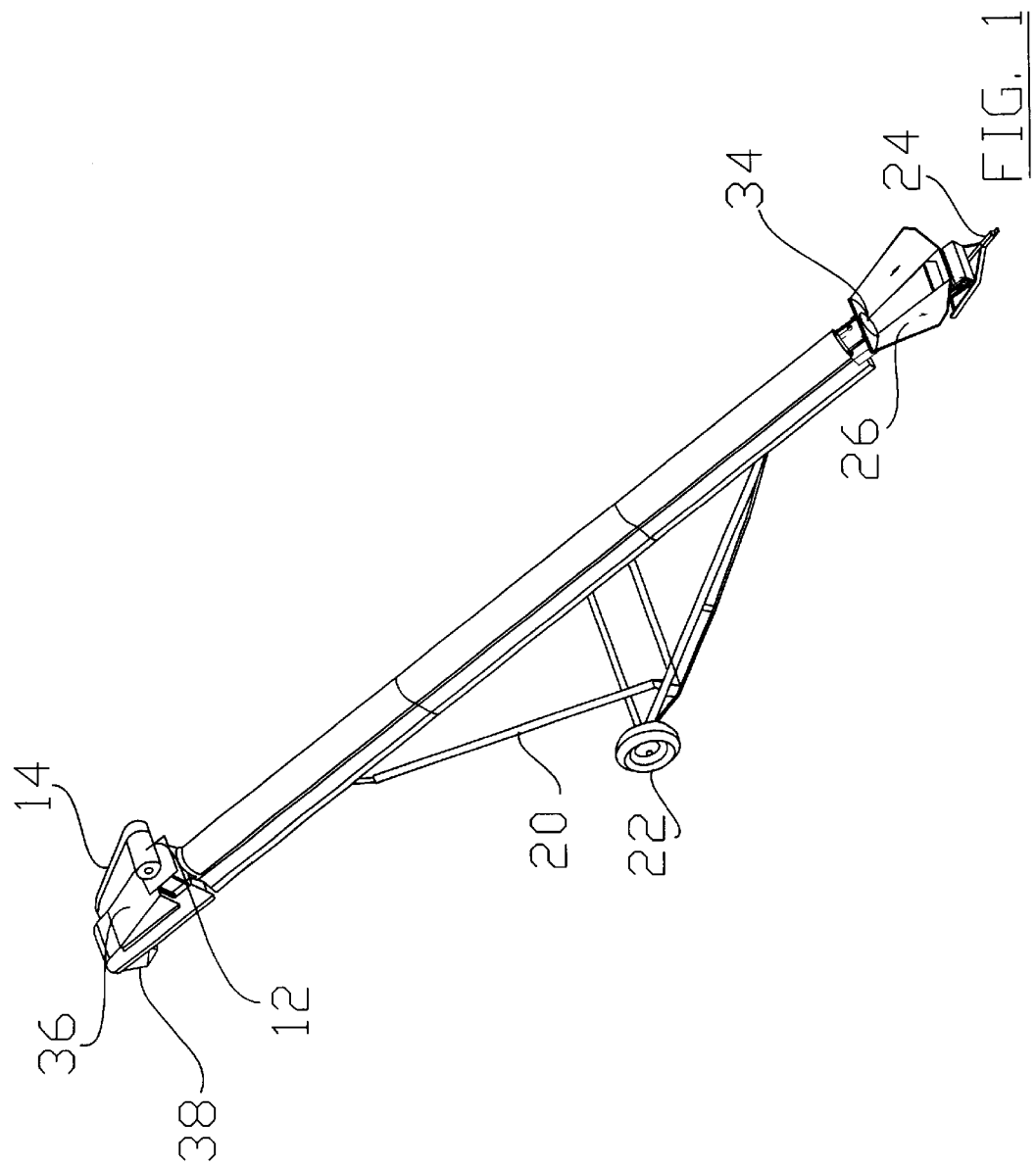
FIG. 1 is an upper perspective view of the present invention.

Turning now descriptively to the drawings, in which similar reference characters denote similar elements throughout the several views, FIGS. 1 through 8 illustrate a conveyor system 10, which comprises a support frame 20, a tube 30 attached to the support frame 20, an endless belt 40 within the tube 30, a plurality of paddle members 50 attached to the outer surface of the endless belt 40, and a wind skirt 60 attached to the lower portion of the tube 30. The plurality of paddle members 50 include a plurality of V-shaped cutouts 52 for allowing the endless belt 40 to become curved or flattened. The wind skirt 60 includes a pair of side slots 62 that receive the outer portions of the endless belt 40. At least one support plate 64 is attached to the wind skirt 60 for maintaining the endless belt 40 within the wind skirt 60 during and after operation.

A shown in FIG. 1 of the drawings, the elongate tube 30 is supported by the support frame 20. The support frame 20 may be comprised of any well-known structure commonly utilized for supporting a belt conveyor or auger. The support frame 20 preferably includes a plurality of wheels 22 for allowing mobility of the present invention, however it can be appreciated that stationary embodiments of the present invention may exist that do not utilize wheels 22.

As shown in FIG. 1 of the drawings, the support frame 20 also preferably includes a hitch 24 for allowing transporting of the present invention from one location to another. It can be appreciated that a hitch 24 is not required for the present invention and that various other embodiments of the support frame 20 may be utilized.

As shown in FIGS. 1 through 5 of the drawings, the tube 30 is an elongate structure having a cylindrical shape thereto. The tube 30 may be comprised of one or more sections secured to one another as can be appreciated. The tube 30 may have any length and size as can be appreciated depending upon the use desired. As shown in FIGS. 4 through 8 of the drawings, the tube 30 includes a lumen 32 for receiving and transporting the particulate material.

Figure 2:
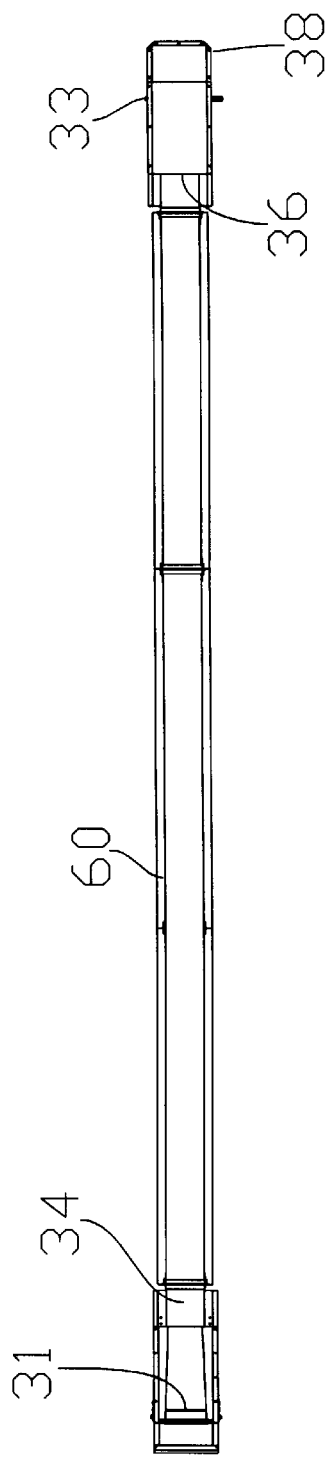
FIG. 2 is a bottom view of the present invention.
Figure 3:
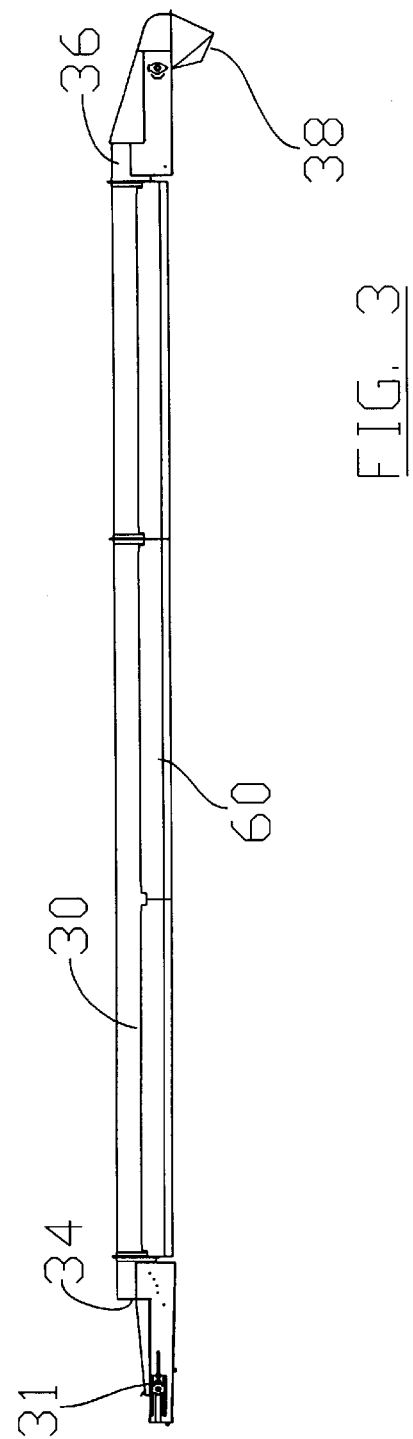
FIG. 3 is a side view of the present invention.
Figure 4:
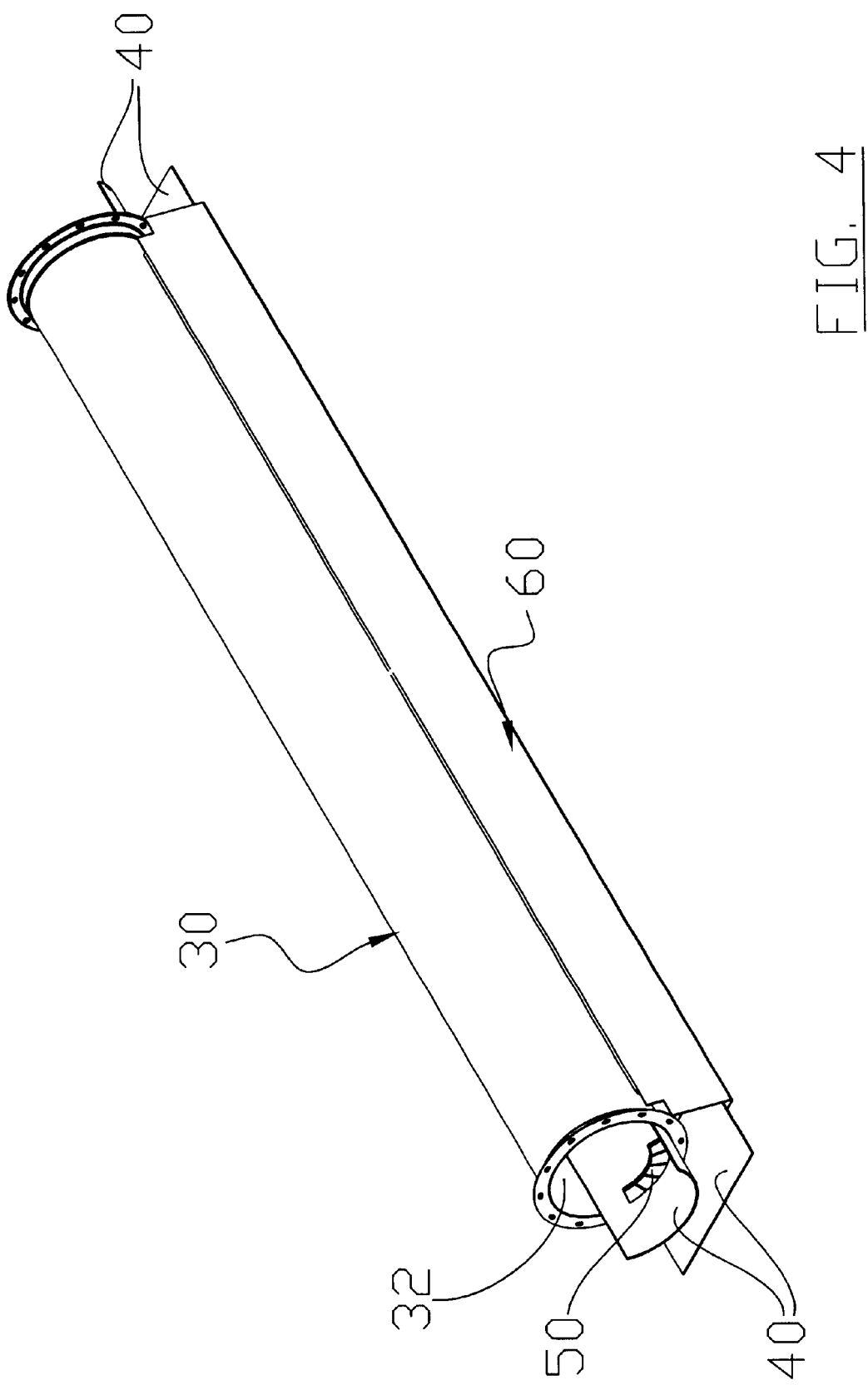
FIG. 4 is a cutaway upper perspective view of the present invention.

As shown in FIGS. 1 through 5 of the drawings, the tube 30 includes an intake end 34 and a discharge end 36. The intake end 34 of the tube 30 receives the particulate material and the discharge end 36 dispenses the particulate material. A spout 38 or other structure may be attached to the discharge end 36 as shown in FIGS. 1 through 3 of the drawings. A funnel 26 or other structure may be attached to the intake end 34 to guide particulate material into the intake end 34 during operation.

As best shown in FIG. 8 of the drawings, the tube 30 preferably has a circular cross sectional area that is capable of slidably receiving the endless belt 40. It can be appreciated that the tube 30 may be comprised of various other cross sectional area shapes such as oval or oblique. The lower portion of the tube 30 may be comprised of various other shapes such as curved, U-shaped, or V-shaped for receiving and cupping the endless belt 40 during operation.

As shown in FIGS. 2 and 3 of the drawings, a first roller 31 is attached to the intake end 34 of the tube 30 for rotatably supporting the endless belt 40. A second roller 33 is attached to the discharge end 36 for rotatably supporting the endless belt 40 opposite of the first roller 31. The endless belt 40 passes through the lumen 32 of the tube 30 about the second roller 33 along the outside of the tube 30 and about the first roller 31 back into the lumen 32 of the tube 30 transporting material from the intake end 34 out through the discharge end 36.

As shown in FIG. 1 of the drawings, a motor 12 is attached to the tube 30 or the support frame 20. The motor 12 is mechanically connected to the second roller 33 by a drive belt 14 or other well-known drive assembly for rotating the endless belt 40 through the lumen 32 of the tube 30. It can be appreciated that various other devices may be utilized to drive the endless belt 40 such as the PTO shaft of a tractor vehicle or similar devices.

As shown in FIGS. 2 through 8, the endless belt 40 is an elongate structure forming an endless loop. The endless belt 40 may include a connection portion for allowing the removal and installation of the endless belt 40 within the tube 30. The endless belt 40 forms a loop about the lower portion of the tube 30 passing through the lower portion of the lumen 32 of the tube 30 and adjacent the lower outer surface of the tube 30.

As shown in FIGS. 4 through 8 of the drawings, the endless belt 40 has a substantially flat portion that supports and receives the particulate material. The endless belt 40 includes an outer surface and an inner surface, wherein the inner surface is engaged by the rollers 31, 33. The outer surfaced of the endless belt 40 supports the particulate material being transferred.

As shown in FIGS. 5 through 8 of the drawings, a plurality of paddle members 50 are attached to the outer surface of the endless belt 40. Each of the paddle members 50 preferably extends orthogonally from the endless belt 40, however it can be appreciated that the paddle members 50 may have various angles and designs with respect to the endless belt 40. The paddle members 50 may be formed within the endless belt 40 or attached by any conventional means. The paddle members 50 may be comprised of any well-known material as can be appreciated.

Figure 5:
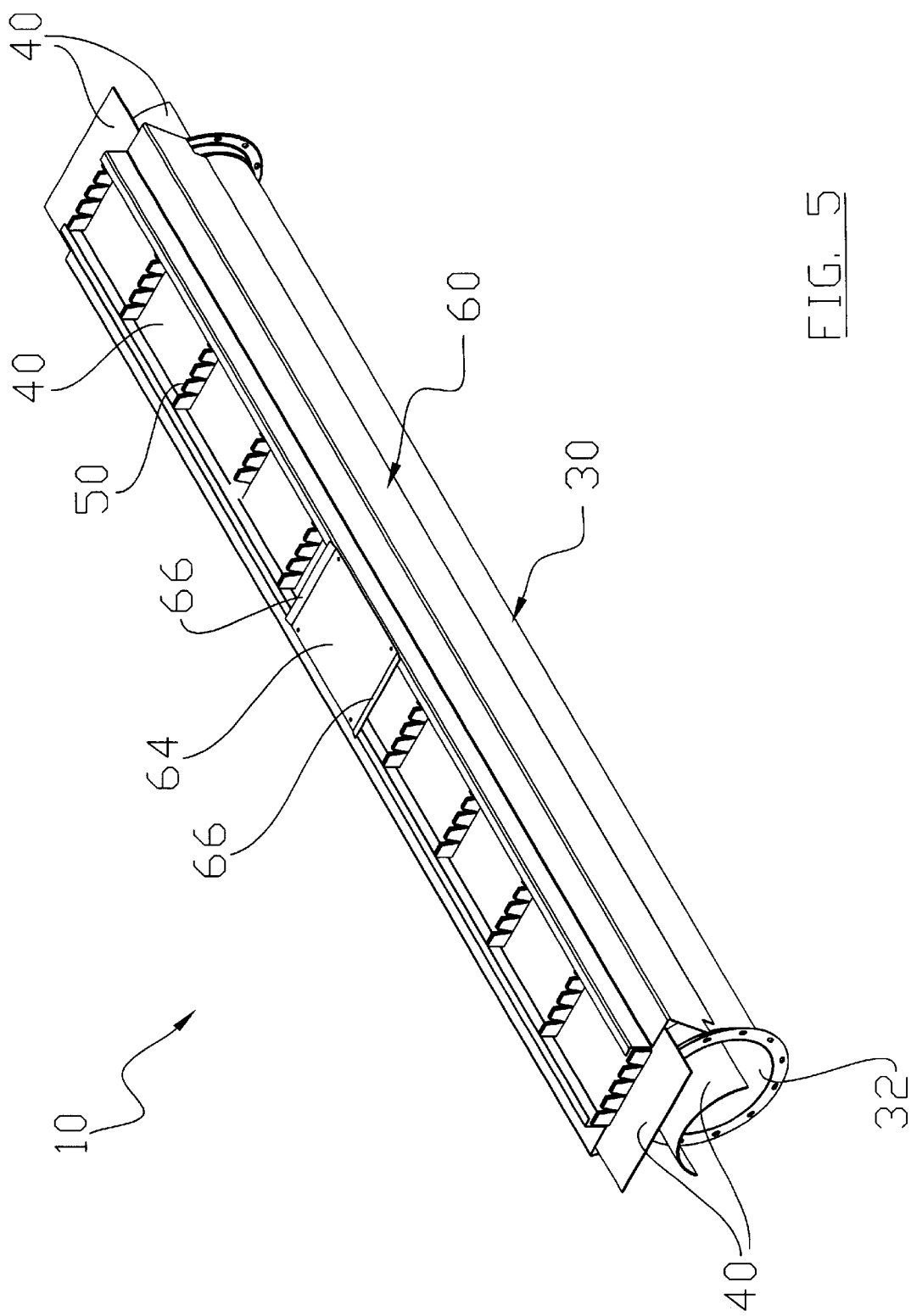
FIG. 5 is a cutaway lower perspective view of the present invention.

The paddle members 50 are spaced upon the outer surface of the endless belt 40 as best shown in FIG. 5 of the drawings. The paddle members 50 may have any desired spacing between them depending upon the type of particulate material being transported.

As best shown in FIG. 8 of the drawings, each of the paddle members 50 includes one or more cutouts 52 into the upper edge of the paddle members 50 to the endless belt 40. The cutouts 52 preferably have a tapered design when the endless belt 40 is in a flat condition as shown in FIG. 8 of the drawings. When the endless belt 40 is positioned within the lumen 32 of the tube 30 the endless belt 40 is curved inwardly thereby closing the openings created by the cutouts 52 and creating a plurality of substantially solid paddle members 50 as shown in FIG. 8 of the drawings. The cutouts 52 allow the endless belt 40 to conform to either a flat structure or an angled structure since the paddle members 50 do not rigidly support the endless belt 40 traverse to the longitudinal axis of the endless belt 40. The paddle members 50 engage and support the particulate material as it is transported through the lumen 32 of the tube 30 from the intake end 34 to the discharge end 36 of the tube 30.

As shown in FIG. 8 of the drawings, the cutouts 52 preferably have a V-shape however various other shaped cutouts 52 may be utilized depending upon the cross sectional shape of the tube 30 and the particulate material to be transported. The cutouts 52 preferably extend from the upper end of the paddle members 50 to the outer surface of the endless belt 40, however it is possible for the cutouts 52 not to fully extend to the outer surface of the endless belt 40 without significantly affecting the performance of the endless belt 40.

As shown in FIGS. 1 through 8 of the drawings, a wind skirt 60 is attached to the lower outer portion of the tube 30. The wind skirt 60 guides the return portion of the endless belt 40 to prevent excessive movement of the endless belt 40 during operation. As shown in FIG. 8 of the drawings, the wind skirt 60 includes a pair of side slots 62 that slidably receive the outer portions of the endless belt 40 for preventing significant side movements and for supporting the return portion of the endless belt 40 during and after operation.

Figure 6:
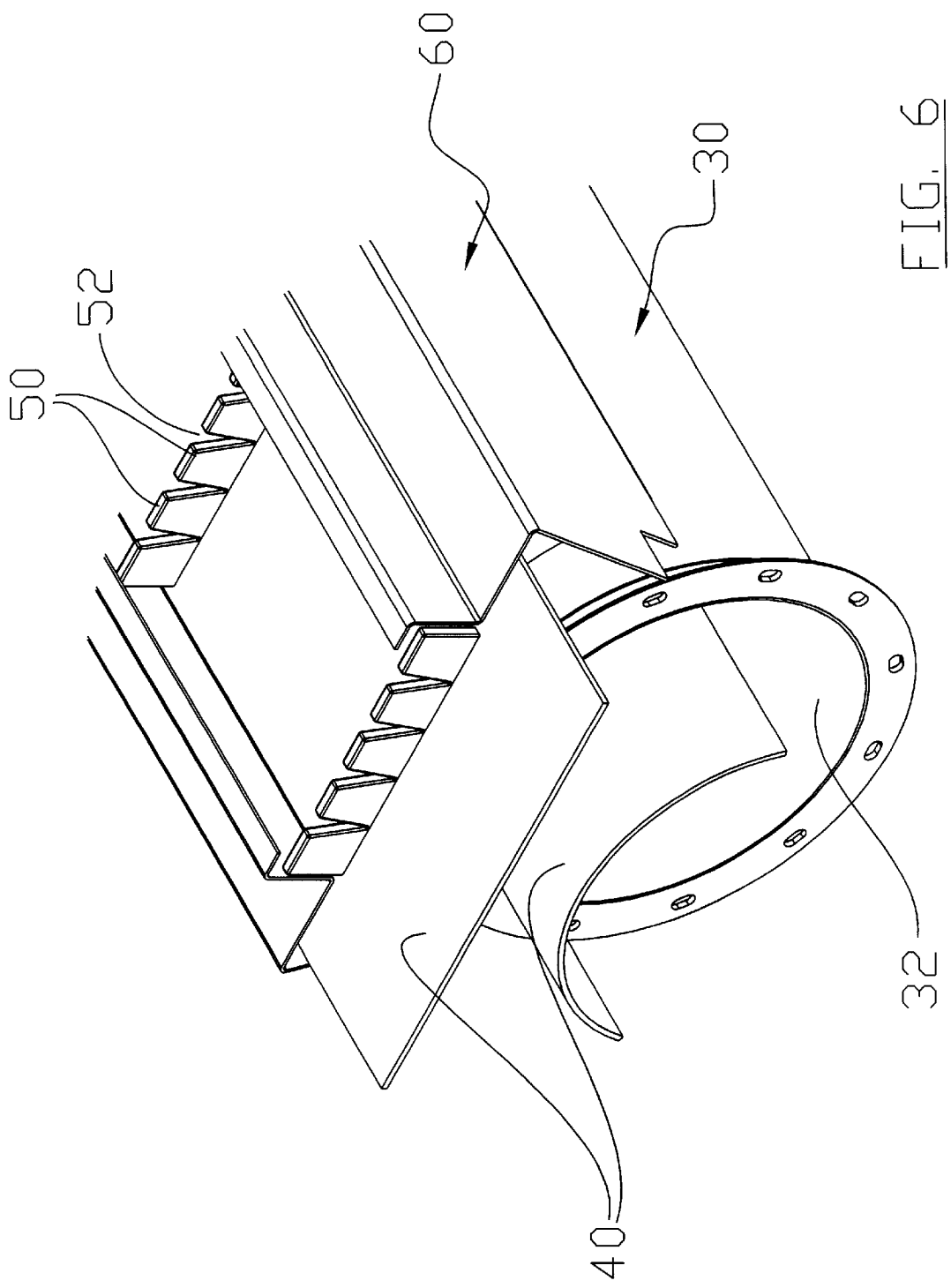
FIG. 6 is a magnified upper perspective view of the present invention in an inverted position.
Figure 7:
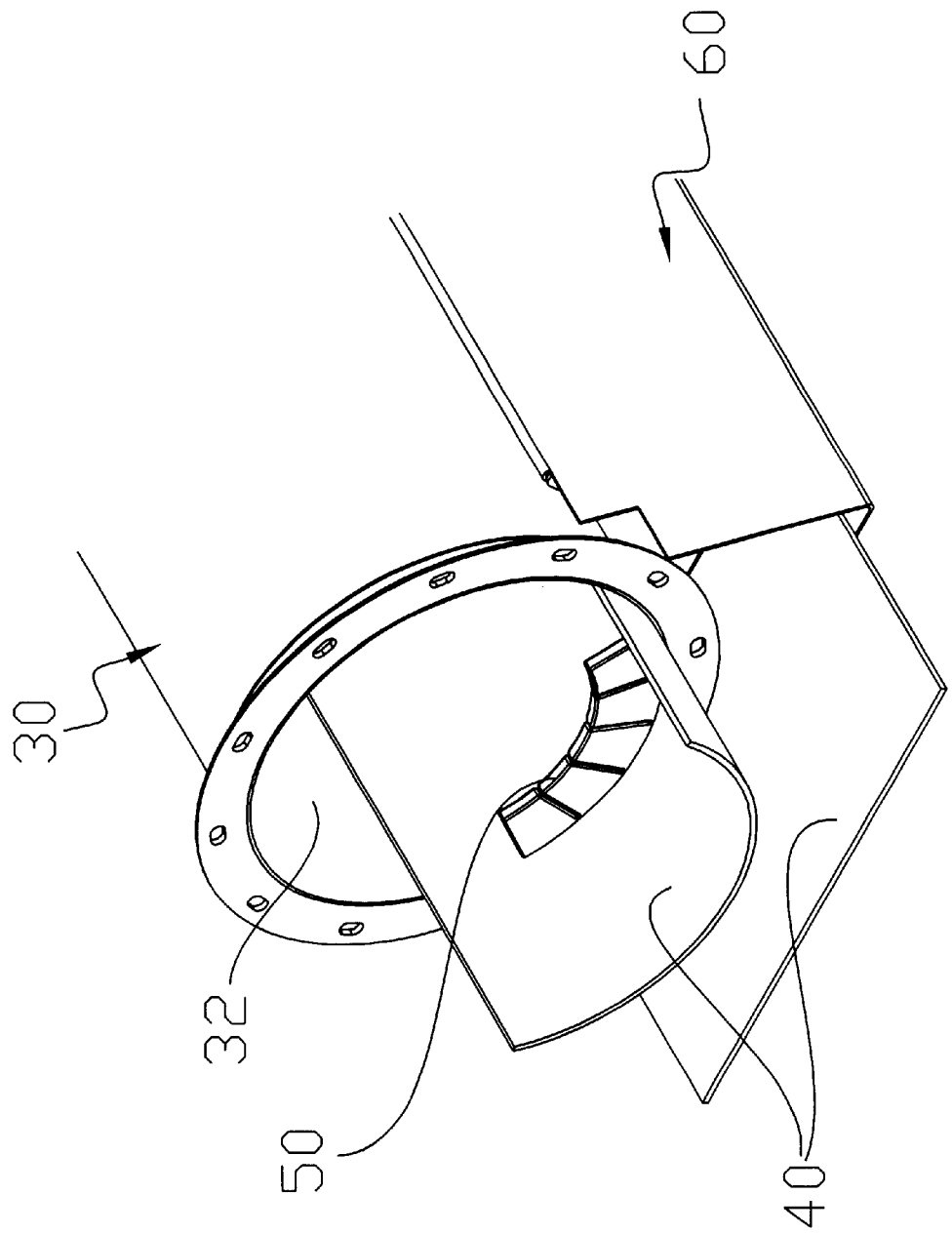
FIG. 7 is a magnified upper perspective view of the present invention.

As shown in FIGS. 5 and 6 of the drawings, the wind skirt 60 has a lower elongate opening for allowing debris to be removed from the endless belt 40. As best shown in FIG. 5 of the drawings, at least one support plate 64 is attached from opposing sides of the lower elongate opening of the wind skirt 60 for preventing the endless belt 40 from leaving the return path of the wind skirt 60. The support plate 64 includes opposing angled edges 66 for preventing damage to the paddle members 50 during operation. During and after operations, the distal ends of the paddle members 50 engage the support plate 64 thereby maintaining the endless belt 40 within the side slots 62 of the wind skirt 60.

In use, the motor 12 is actuated to rotate the endless belt 40 about the tube 30. The delivery portion of the endless belt 40 passes through the lumen 32 of the tube 30 from the intake end 34 to the discharge end 36 carrying the particulate material at an upward angle. The paddle members 50 prevent the particulate material from falling downwardly during operation of the present invention. The cutouts 52 of the paddle members 50 are significantly closed upon the delivery portion of the endless belt 40 because of the curved walls of the tube 30. The outer portions of the endless belt 40 engage the outer portions of the particulate material and prevent the particulate material from building up upon the inner side portions of the lumen 32 of the tube 30 which can reduce the efficiency and operation of the present invention as shown in FIG. 8 of the drawings. The outer portions of the endless belt 40 preferably extend upwardly within the lumen 32 of the tube 30 for engaging a significant portion of particulate material. As shown in FIG. 8 of the drawings, the outer portions of the endless belt 40 may extend higher than the highest portion of the paddle members 50. As the particulate material is transported through the lumen 32 of the tube 30 it eventually reaches the discharge end 36 where the endless belt 40 is positioned about the second roller 33. As the endless belt 40 passes about the second roller 33, the particulate material is allowed to be released from the endless belt 40 through the discharge end 36 onto the desired location such as a grain bin. As the endless belt 40 engages the second roller 33, it is flattened thereby opening the cutouts 52. The return portion of the endless belt 40 thereafter enters the wind skirt 60 where the outer portions of the endless belt 40 are slidably received and guided within the side slots 62. The distal ends of the paddle members 50 engage the support plate 64 thereby preventing the endless belt 40 from falling out of the wind skirt 60 during and after operations. The endless belt 40 thereafter moves about the first roller 31 and receives new particulate material at the intake end 34 of the tube 30. As the endless belt 40 reenters the lumen 32 of the tube 30, the endless belt 40 is formed to the shape of the lower portion of the lumen 32 thereby significantly closing the cutouts 52 and forming a plurality of solid paddle members 50 for engaging and supporting the particulate material. The process continues until the user terminates the operation of the endless belt 40.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:
1. A conveyor system, comprising:
a tube having a lumen, an intake end and a discharge end, wherein said lumen has a lower portion and an upper portion;
an endless belt having an outer surface and an inner surface positioned about said tube, wherein a delivery portion of said endless belt is positioned within said lumen and wherein a return portion of said endless belt is positioned outside said lumen;
a drive assembly mechanically connected to said endless belt for rotating said endless belt;
a plurality of paddle members attached to said outer surface of said endless belt;
each of said plurality of paddle members includes at least one cutout; and
a wind skirt attached to a lower exterior portion of said tube for slidably receiving said return portion, wherein said wind skirt is comprised of a pair of elongate side walls that are comprised of a solid structure for preventing wind from engaging said return portion of said endless belt and wherein said pair of elongate side walls each have a longitudinal axis parallel to said return portion of said endless belt and wherein said pair of elongate side walls have a lower edge that extends past a distal end of each of said plurality of paddle members.

2. The conveyor system of claim 1, wherein said lower portion of said lumen is curved.

3. The conveyor system of claim 1, wherein said lower portion of said lumen is U-shaped.

4. The conveyor system of claim 1, wherein said at least one cutout has a V-shape.

5. The conveyor system of claim 1, wherein said at least one cutout is tapered toward said endless belt.

6. The conveyor system of claim 5, wherein said at least one cutout extends to said endless belt.

7. The conveyor system of claim 1, wherein said wind skirt includes a pair of side slots for slidably receiving opposing outer portions of said endless belt.

8. The conveyor system of claim 1, wherein said wind skirt further includes at least one support plate extending between said lower edge of said pair of elongate side walls.

9. The conveyor system of claim 8, wherein said support plate includes a pair of opposing angled edges that are angled away from said return portion of said endless belt to reduce damage to said plurality of paddle members during movement of said endless belt.

* * * * *